(12) United States Patent
Kaneko et al.

(10) Patent No.: US 9,666,372 B2
(45) Date of Patent: May 30, 2017

(54) DIELECTRIC CERAMIC COMPOSITION AND CERAMIC ELECTRONIC DEVICE

(71) Applicant: TDK CORPORATION, Minato-ku, Tokyo (JP)

(72) Inventors: Toshihiko Kaneko, Tokyo (JP); Tatsuya Fujino, Tokyo (JP); Nobuto Morigasaki, Tokyo (JP); Yasuhiro Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/064,431

(22) Filed: Mar. 8, 2016

(65) Prior Publication Data
US 2016/0268045 A1 Sep. 15, 2016

(30) Foreign Application Priority Data

Mar. 13, 2015 (JP) ................. 2015-050941

(51) Int. Cl.
*C04B 35/468* (2006.01)
*H01G 4/12* (2006.01)
(Continued)

(52) U.S. Cl.
CPC ....... *H01G 4/1227* (2013.01); *C04B 35/4682* (2013.01); *C04B 35/488* (2013.01); *C04B 35/49* (2013.01); *H01G 4/30* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3236* (2013.01); *C04B 2235/3239* (2013.01); *C04B 2235/3249* (2013.01); (Continued)

(58) Field of Classification Search
CPC .......................... C04B 35/4682; H01G 4/1227
See application file for complete search history.

(56) References Cited

U.S. PATENT DOCUMENTS 7,271,115 B2 * 9/2007 Suzuki ..................... H01G 4/30
361/321.4
7,759,269 B2 * 7/2010 Takahashi ............... B82Y 30/00
501/138
(Continued)

FOREIGN PATENT DOCUMENTS

JP H07-037427 A 2/1995
JP 2013151380 * 8/2013

*Primary Examiner* — Karl Group
(74) *Attorney, Agent, or Firm* — Arent Fox LLP (57) ABSTRACT

A dielectric ceramic composition including a main component having a perovskite crystal structure expressed by general formula $ABO_3$, a first sub-component of an oxide of a rare earth element, and a second sub-component of an oxide of Si, and at least dielectric particles having a core-shell structure and segregated particles, in which a concentration of the rare earth element in the segregated particles is two or more times an average concentration of the rare earth element in a shell portion of the dielectric particles having the core-shell structure, and an area of the region occupied by the segregated particles is 5.0% or less and an average of cross-sectional areas of the respective segregated particles is 0.075 $\mu m^2$ or less in a cross-section obtained by cutting the dielectric ceramic composition.

6 Claims, 2 Drawing Sheets

(51) Int. Cl.
*H01G 4/30* (2006.01)
*C04B 35/488* (2006.01)
*C04B 35/49* (2006.01)

(52) U.S. Cl.
CPC ........ *C04B 2235/3262* (2013.01); *C04B 2235/3418* (2013.01); *C04B 2235/5454* (2013.01); *C04B 2235/6025* (2013.01); *C04B 2235/6562* (2013.01); *C04B 2235/6565* (2013.01); *C04B 2235/6567* (2013.01); *C04B 2235/6584* (2013.01); *C04B 2235/6588* (2013.01); *C04B 2235/768* (2013.01); *C04B 2235/79* (2013.01); *C04B 2235/80* (2013.01); *C04B 2237/346* (2013.01); *C04B 2237/68* (2013.01)

(56) References Cited

U.S. PATENT DOCUMENTS

| | | | | |
|---|---|---|---|---|
| 8,492,301 B2* | 7/2013 | Takano | ............... | C04B 35/4682 361/321.4 |
| 9,440,885 B2* | 9/2016 | Morigasaki | ......... | C04B 35/4682 |
| 2003/0203805 A1* | 10/2003 | Maher | ................. | H01G 4/1227 501/137 |
| 2012/0033343 A1* | 2/2012 | Yoon | ...................... | B32B 18/00 361/305 |
| 2012/0050941 A1* | 3/2012 | Murakawa | ......... | C04B 35/4682 361/321.1 |

* cited by examiner

DIELECTRIC CERAMIC COMPOSITION AND CERAMIC ELECTRONIC DEVICE

CROSS-REFERENCE TO RELATED APPLICATIONS

This application claims priority to Japanese Patent Application No. 2015-050941, filed Mar. 13, 2015. The disclosure of the priority application is incorporated in its entirety herein by reference.

BACKGROUND OF THE INVENTION

1. Field of the Invention

The present invention relates to a dielectric ceramic composition and a ceramic electronic device having a dielectric layer composed of the dielectric ceramic composition.

2. Description of the Related Art

A laminated ceramic capacitor as an example of a ceramic electronic device is widely used as an electronic device which has a small size and exhibits high performance and high reliability, and a number of laminated ceramic capacitors are mounted as an electronic device for motor vehicle.

The laminated ceramic capacitor for mounting on a motor vehicle is essentially required to exhibit high reliability even in a high-temperature and high-voltage environment as well as to have a small size and to exhibit high performance. In recent years, the laminated ceramic capacitor is required to be improved in operation guarantee and reliability in a high-temperature environment of from 125 to 150° C. and at from 16 V to 100 V.

A laminated ceramic capacitor exhibiting high reliability while meeting the X8R characteristics is described in Patent Literature 1.

In recent years, however, it has been required that the laminated ceramic capacitor is further miniaturized and the dielectric layer is thinned. It has been known that the reliability decreases when the dielectric layer is thinned in association with the miniaturization of the laminated ceramic capacitor as the electric field intensity to the dielectric layer is stronger even though the same voltage is applied.

Patent Literature 1: Japanese Unexamined Patent Publication No. H7-37427

SUMMARY OF THE INVENTION

The present invention has been made in view of such circumstances, and an object thereof is to provide a dielectric ceramic composition exhibiting favorable temperature characteristics and sufficient reliability even in a case in which the dielectric layer is thinner than that of the prior art and the electric field intensity applied to the dielectric layer is increased and in a case in which the number of laminated layers is increased, and an electronic device.

Means for Solving the Problem

In order to achieve the above object, the dielectric ceramic composition according to the present invention is a dielectric ceramic composition which includes:

a main component having a perovskite crystal structure expressed by general formula $ABO_3$ where A is at least one selected from Ba, Ca, and Sr and B is at least one selected from Ti and Zr;

a first sub-component of an oxide of a rare earth element; and a second sub-component of an oxide of Si; and at least dielectric particles having a core-shell structure and segregated particles, in which a concentration of the rare earth element in the segregated particles is two or more times an average concentration of the rare earth element in a shell portion of the dielectric particles having the core-shell structure, and an area of the region occupied by the segregated particles is 5.0% or less and an average of cross-sectional areas of the respective segregated particles is 0.075 $\mu m^2$ or less in a cross-section obtained by cutting the dielectric ceramic composition.

It is preferable that the dielectric ceramic composition contains at least an oxide of Eu as the first sub-component.

It is preferable that the dielectric ceramic composition contains at least oxides of three kinds of rare earth elements as the first sub-component.

It is preferable that the dielectric ceramic composition contains at least an oxide of Ra and an oxide of Rb as the first sub-component where Ra is at least one selected from Sc, Er, Tm, Yb, and Lu and Rb is at least one selected from Y, Dy, Ho, Tb, and Gd.

It is preferable that
$0.075 \leq \alpha \leq 0.5$,
$0.5 \leq \beta \leq 3$,
$1.0 \leq \gamma \leq 4$,
$1.5 \leq \delta \leq 5$, and
$0.030 \leq \alpha/\delta \leq 0.250$
where a content of an oxide of Eu with respect to 100 moles of the main component is $\alpha$ mole in terms of $Eu_2O_3$, a content of an oxide of Ra (Sc, Er, Tm, Yb, Lu) is $\beta$ mole in terms of $Ra_2O_3$, a content of an oxide of Rb (Y, Dy, Ho, Tb, Gd) is $\gamma$ mole in terms of $Rb_2O_3$, and a content of the second sub-component is $\delta$ mole in terms of $SiO_2$ in the dielectric ceramic composition.

It is preferable that the segregated particles do not substantially contain Eu in the dielectric ceramic composition.

In addition, the ceramic electronic device according to the present invention has a dielectric layer formed of the dielectric ceramic composition and electrode layers.

Advantageous Effects of Invention

The present invention relates to a dielectric ceramic composition, and the ceramic composition includes at least dielectric particles having a core-shell structure and segregated particles, in which the area of the region occupied by the segregated particles is from 0.5 to 5.0% and the average cross-sectional area of the segregated particles is 0.075 $\mu m^2$ or less in the cross-section obtained by cutting the dielectric ceramic composition. Hence, it is possible to provide a dielectric ceramic composition in which the change of capacitance is small in a wide temperature range of from −55 to 150° C., the insulation resistance is high even at a high temperature of about 150° C., and the highly accelerated life time is excellent. For this reason, it is possible to meet the X8R characteristics of the EIA standards even though the dielectric layer composed of the dielectric ceramic composition is thinned, and as a result, it is possible to provide a ceramic electronic device, such as a laminated ceramic capacitor, which has a small size and a high capacitance.

In addition, a ceramic electronic device, such as a laminated ceramic capacitor, which is composed of a dielectric layer composed of this dielectric ceramic composition is capable of stably operating in various kinds of instruments

DESCRIPTION OF THE PREFERRED EMBODIMENTS

Hereinafter, the present invention will be explained with reference to embodiments illustrated in the drawings.

(Laminated Ceramic Capacitor)

Figure 1:
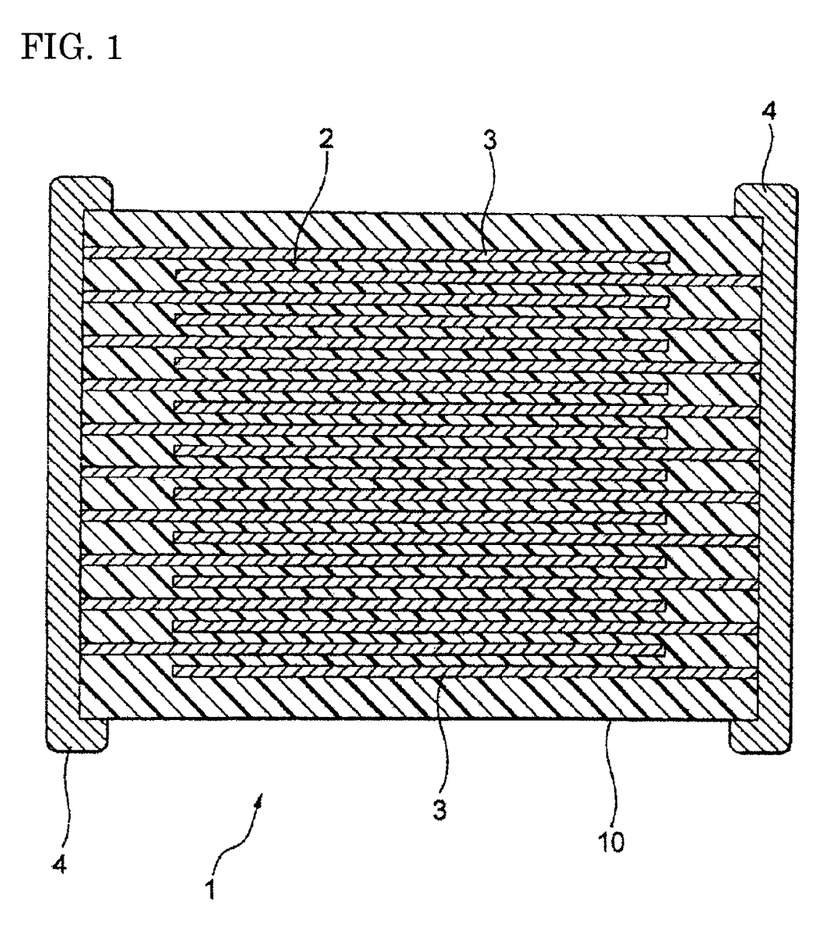
FIG. 1 is a cross-sectional view of a laminated ceramic capacitor according to an embodiment of the present invention.

As illustrated in FIG. 1, a laminated ceramic capacitor 1 as an example of ceramic electronic devices includes a capacitor device body 10 having a configuration in which a dielectric layer 2 and an internal electrode layer 3 are alternately laminated. The internal electrode layer 3 is laminated such that each end face thereof is alternately exposed to the surfaces of two end portions facing the capacitor device body 10. A pair of external electrodes 4 are formed at both end portions of the capacitor device body 10 and connected to the exposed end faces of the internal electrode layers 3 which are alternately disposed to form a capacitor circuit.

The shape of the capacitor device body 10 is not particularly limited, but it is usually a rectangular parallelepiped as illustrated in FIG. 1. In addition, the dimensions thereof are not also particularly limited.

(Dielectric Layer)

The dielectric layer 2 is composed of the dielectric ceramic composition according to the present embodiment. The dielectric ceramic composition according to the present embodiment contains a compound expressed by general formula $ABO_3$ (A is at least one selected from Ba, Ca, and Sr and B is at least one selected from Ti and Zr) as a main component. In addition, the dielectric ceramic composition contains dielectric particles containing $ABO_3$ as a main component.

Specific examples of the compound expressed by general formula $ABO_3$ may include a compound represented by $\{(Ba_{1-x-y}Ca_xSr_y)O\}_u(Ti_{1-z}Zr_z)_vO_3$. Incidentally, any of u, v, x, y, or z is in an arbitrary range, but they are preferably in the following ranges.

In the formula above, x is preferably $0 \leq x \leq 0.1$ and more preferably $0 \leq x \leq 0.05$. As x is in the above range, it is possible to improve the temperature characteristics and specific dielectric constant of the dielectric layer composed of the dielectric ceramic composition according to the present embodiment. In addition, in the present embodiment, Ca may not be necessarily contained. In other words, x may be 0.

In the formula above, y is preferably $0 \leq y \leq 0.1$ and more preferably $0 \leq y \leq 0.05$. As y is in the above range, it is possible to improve the temperature characteristics and specific dielectric constant of the dielectric layer composed of the dielectric ceramic composition according to the present embodiment. In addition, in the present embodiment, Sr may not be necessarily contained. In other words, y may be 0.

In the formula above, z is preferably $0 \leq z \leq 0.3$ and more preferably $0 \leq z \leq 0.15$. As z is in the above range, it is possible to improve the temperature characteristics and specific dielectric constant of the dielectric layer composed of the dielectric ceramic composition according to the present embodiment. In addition, in the present embodiment, Zr may not be necessarily contained. In other words, z may be 0.

In addition, it is preferable that the main component of the dielectric ceramic composition according to the present embodiment is barium titanate. In other words, it is preferable that $x=y=z=0$.

The dielectric ceramic composition according to the present embodiment at least contains a first sub-component of an oxide of a rare earth element and a second sub-component of an oxide of Si as the sub-component together with the main component.

It is preferable to contain an oxide of Eu as the first sub-component. It is preferable to contain oxides of at least three kinds of rare earth elements as the first sub-component. It is preferable to contain an oxide of Ra (at least one selected from Sc, Er, Tm, Yb, and Lu) and an oxide of Rb (at least one selected from Y, Dy, Ho, Tb, and Gd) as the first sub-component. Moreover, it is even more preferable to contain all of an oxide of Eu, an oxide of Ra, and an oxide of Rb as the first sub-component.

When the content of an oxide of Eu with respect to 100 moles of the main component is $\alpha$ mole in terms of $Eu_2O_3$, $\alpha$ is preferably 0.075 or more and 0.5 or less and more preferably 0.10 or more and 0.4 or less. The dielectric constant, temperature characteristics, and highly accelerated life time tend to be favorable as $\alpha$ is set to be within the above range.

When the content of an oxide of Ra with respect to 100 moles of the main component is $\beta$ mole in terms of $Ra_2O_3$, $\beta$ is preferably 0.5 or more and 3 or less and more preferably 1.0 or more and 2.5 or less. The dielectric constant, temperature characteristics, and highly accelerated life time tend to be favorable as $\beta$ is set to be within the above range. In addition, it is even more preferable to use Yb as Ra.

When the content of an oxide of Rb with respect to 100 moles of the main component is $\gamma$ mole in terms of $Rb_2O_3$, $\gamma$ is preferably 1.0 or more and 4 or less and more preferably 1.4 or more and 3 or less. The dielectric constant, temperature characteristics, and highly accelerated life time tend to be favorable as $\gamma$ is set to be within the above range. In addition, it is preferable to use Y as Rb, and it is even more preferable to use both of Y and Tb as Rb.

When the content of an oxide of Si of the second sub-component with respect to 100 moles of the main component is $\delta$ mole in terms of $SiO_2$, $\delta$ is preferably 1.5 or more and 5 or less. In addition, it is preferable to meet $0.030 \leq \alpha/\delta \leq 0.25$. The dielectric constant, temperature characteristics, and highly accelerated life time tend to be favorable as $\delta$ and $\alpha/\delta$ are set to be within the above ranges.

As described above, in the present embodiment, it is preferable to contain an oxide of Eu, an oxide of Ra, and an oxide of Rb as the first sub-component together with the main component. Here, Eu, Ra, and Rb are classified in accordance with the size of the ionic radius of each rare earth element. The ionic radius of Eu is large, the ionic radius of Ra is small, and the ionic radius of Rb is positioned in the middle of the ionic radius of Eu and the ionic radius of Ra.

An oxide of Eu, an oxide of Ra, and an oxide of Rb are dissolved in the dielectric particles containing the main component in a solid state. As the oxides of the respective rare earth elements are dissolved in the dielectric particles in a solid state, the dielectric particles form a so-called core-shell structure.

There is a tendency that the Curie temperature of the main component and the temperature characteristics of capacitance are favorable and the highly accelerated life time is improved as an oxide of Ra is contained at a content within the preferred range.

The highly accelerated life time and the temperature characteristics of capacitance tend to be improved as an oxide of Eu and/or an oxide of Rb are contained at contents within the preferred ranges.

In addition, in the present embodiment, it is preferable to contain an oxide of Si, for example, $SiO_2$ as the second sub-component. Incidentally, $SiO_2$ has a function as a sintering aid. Here, an oxide of Si is likely to form a composite oxide with the first sub-component. Furthermore, the particles of a composite oxide of the first sub-component and the second sub-component are segregated separately from the core-shell particles to form particles constituting the dielectric ceramic composition.

Figure 2:
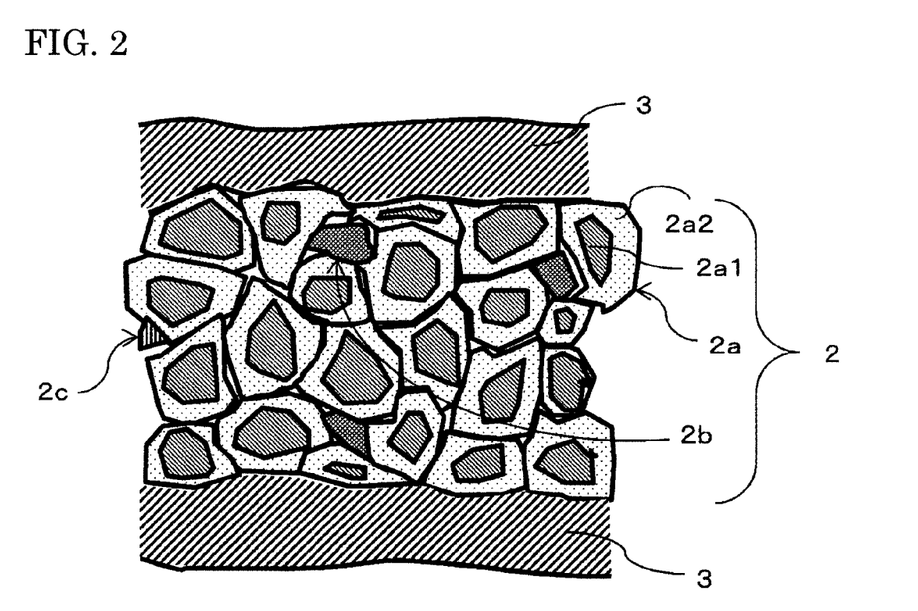
FIG. 2 is an enlarged cross-sectional view of the principal portion of the dielectric layer 2 illustrated in FIG. 1.

In the present embodiment, as illustrated in FIG. 2, the area of the region occupied by the segregated particles $2b$ to be described later is 5.0% or less and the average of cross-sectional areas of the respective segregated particles $2b$ (hereinafter, also referred to as the average cross-sectional area of the segregated particles $2b$) is 0.075 $\mu m^2$ or less in the cross-section obtained by cutting the fired dielectric ceramic composition which constitutes the dielectric layer 2. It is possible to achieve both the improvement in highly accelerated life time and the improvement in temperature characteristics of capacitance which are contrary to each other by adjusting the area of the region occupied by the segregated particles $2b$ and the average cross-sectional area of the segregated particles $2b$. Furthermore, the highly accelerated life time and the temperature characteristics of capacitance are further improved in a case in which the dielectric layer 2 does not substantially contain the Eu-containing segregated particles to be described later. In addition, the expression "the Eu-containing segregated particles are not substantially contained" refers to a case in which the number of Eu-containing segregated particles is less than 10% in the entire segregated particles $2b$.

Incidentally, in the present embodiment, it is possible to adjust the area of the region occupied by the segregated particles $2b$, the average cross-sectional area of the segregated particles $2b$, and the content of Eu in the segregated particles $2b$ by, for example, adjusting the content of the first sub-component, the content of the second sub-component, and the ratio of the content of the first sub-component to the content of the second sub-component. As the content of each sub-component is adjusted such that the area of the region occupied by the segregated particles $2b$ is set to 5.0% or less and the average cross-sectional area of the segregated particles $2b$ is set to 0.075 $\mu m^2$ or less, a laminated ceramic capacitor 1 exhibiting favorable highly accelerated life time and temperature characteristics of capacitance is obtained.

In addition, in the present embodiment, it is possible to further improve the characteristics of the dielectric ceramic composition as the dielectric ceramic composition further contains a third sub-component including at least one selected from oxides of Ba and Ca, a fourth sub-component including at least one selected from oxides of Mn and Cr, a fifth sub-component including at least one selected from oxides of V, Mo, and W, and a sixth sub-component of an oxide of Mg in amounts to be within predetermined ranges.

As the third sub-component is contained, the abnormal grain growth of the dielectric particles containing the main component is suppressed and a decrease in highly accelerated life time due to the abnormal grain growth is suppressed. In addition, although the upper limit of the content of the third sub-component is not regulated, it is possible to suppress an increase in firing temperature and the structural change of the dielectric ceramic composition by setting the content of the third sub-component to an appropriate amount.

The content of the third sub-component with respect to 100 moles of the main component is preferably 0.5 mole or more and 4 moles or less in terms of BaO or CaO. In addition, it is preferable to contain at least an oxide of Ba as the third sub-component.

Furthermore, in a case in which the total substance amount of Ba, Ca, and Sr contained in the main component and Ba and Ca contained in the third sub-component is denoted as $A_t$ and the total substance amount of Ti and Zr contained in the main component is denoted as $B_t$, it is preferably $1.004 \leq A_t/B_t \leq 1.054$ and it is more preferably $1.009 \leq A_t/B_t \leq 1.054$.

It is possible to further improve the highly accelerated life time as the fourth sub-component is contained in an appropriate amount. The content of the fourth sub-component with respect to 100 moles of the main component is preferably 0.05 mole or more and 0.3 moles or less in terms of MnO or $Cr_2O_3$. In addition, in the present embodiment, it is preferable to contain at least an oxide of Mn as the fourth sub-component.

It is possible to further improve the highly accelerated life time as the fifth sub-component is contained. In addition, although the upper limit of the content of the fifth sub-component is not regulated, it is possible to suppress a decrease in insulation resistance as the content of the fifth sub-component is set to an appropriate amount. Hence, the content of the fifth sub-component with respect to 100 moles of the main component is preferably 0.01 mole or more and 0.15 mole or less in terms of $V_2O_5$, $Mo_2O_3$, or $WO_3$. In addition, it is preferable to contain at least an oxide of V as the fifth sub-component.

The abnormal grain growth of the dielectric particles containing the main component is prevented and also sintering is promoted as the sixth sub-component is contained in an appropriate amount. As a result, the highly accelerated life time is improved. In the present embodiment, the content of the sixth sub-component with respect to 100 moles of the main component is preferably from 0.5 to 1.8 moles in terms of MgO.

The average crystal grain size of the dielectric ceramic composition of the present embodiment is not particularly limited. It can be appropriately determined from the range of, for example, from 0.1 to 3.0 $\mu m$ depending on the thickness of the dielectric layer, but it may be out of the above range.

In general, the temperature characteristics of capacitance in the laminated ceramic capacitor tend to deteriorate as the dielectric layer is thinner. This is derived from the fact that it is inevitably required to decrease the average crystal grain size of the dielectric ceramic composition in order to thin the dielectric layer and thus the temperature characteristics of capacitance of the laminated ceramic capacitor tend to deteriorate as the average crystal grain size is smaller. The dielectric ceramic composition of the present embodiment is particularly suitably used in a case in which the average crystal grain size is required to be decreased, specifically, in a case in which the average crystal grain size is required to be from 0.1 to 0.5 $\mu m$. In addition, in general, the highly accelerated life time is favorable and the time dependent change in capacitance in a direct current electric field is small in a case in which the average crystal grain size is small. It is preferable to set the average crystal grain size as small as from 0.1 to 0.5 μm from this point of view as well.

The X8R characteristics are met and thus high reliability can be achieved even in a case in which the thickness of the dielectric layer 2 composed of the dielectric ceramic composition of the present embodiment is usually 5 μm or less and particularly 3 μm or less per one layer. The dielectric ceramic composition of the present embodiment is effective in improving the temperature characteristics of capacitance of a laminated ceramic capacitor having such a thinned dielectric layer. Incidentally, the number of dielectric layers laminated in the laminated ceramic capacitor using the dielectric ceramic composition of the present embodiment is usually about from 2 to 300.

The laminated ceramic capacitor using the dielectric ceramic composition of the present embodiment is suitably used as an electronic device for an instrument that is used in an environment of 80° C. or higher, particularly, from 125 to 150° C. Moreover, in such a temperature range, the temperature characteristics of capacitance meet the R characteristics of the EIA standards, and further, also meet the X8R characteristics as well. In addition, it is also possible to meet the B characteristics (rate of change in capacitance at from −25 to 85° C. is within ±10%) of the EIAJ standards and the X7R characteristics (ΔC=±15% or less at from −55 to 125° C.) of the EIA standards at the same time.

In a general laminated ceramic capacitor, in usual use conditions, an alternating electric field of 0.1 V/μm or more, particularly 0.5 V/μm or more, and generally about 5 V/μm or less and a direct current electric field of 5 V/μm or more and 50 V/μm or less to be superimposed on this are applied to the dielectric layer. The temperature characteristics of capacitance of the laminated ceramic capacitor using the dielectric ceramic composition of the present embodiment are significantly stable even though such an electric field is applied.

(Dielectric Particles having Core-shell Structure, and Segregated Particles)

As illustrated in FIG. 2, in the dielectric ceramic composition according to the present embodiment, dielectric particles 2a having a core-shell structure in which at least a rare earth oxide as an sub-component is dissolved in the $ABO_3$ particles of the main component in a solid state and segregated particles 2b containing a rare earth oxide at a high concentration are present. Furthermore, other dielectric particles 2c which do not correspond to the dielectric particles 2a having the core-shell structure and the segregated particles 2b may be present in the dielectric ceramic composition.

The technique to identify the dielectric particles 2a having a core-shell structure is not limited, but for example, the dielectric particles 2a are identified as particles which have different contrasts in the central portion and the peripheral portion when a reflected electron image of the cut cross-section is taken using a scanning electron microscope (FE-SEM). Moreover, the central portion of the dielectric particles 2a is adopted as a core portion 2a1 and the peripheral portion is adopted as a shell portion 2a2 as illustrated in FIG. 2.

The segregated particles 2b are particles in which the concentration of the rare earth oxide is 2 times or more the average concentration of the rare earth oxide in the shell portion 2a2 of the dielectric particles 2a having a core-shell structure in the entire region of the particles. The segregated particles 2b have a contrast different from those of the core portion 2a1 and the shell portion 2a2 in the reflected electron image.

(Cross-sectional Area of Segregated Particles and Measurement of Segregation Rate)

The method for measuring the cross-sectional area of the segregated particles 2b contained in the dielectric layer 2 and the area occupied by the segregated particles 2b contained in the dielectric layer 2 is not limited. For example, they are measured by the following method. First, the laminated ceramic capacitor 1 obtained is cut in a plane perpendicular to the internal electrode layer 3, and a photograph of the reflected electron image of the cut cross-section is taken using a scanning electron microscope (FE-SEM). The number of photographs of the reflected electron image, the observed area, and the magnification are not particularly limited, but it is preferable to take plural times so that the dielectric particles 2a having a core-shell structure are included about 1000 or more in total. In addition, it is preferable to set the magnification to approximately 20000 times. The reflected electron image is processed using the image processing software to calculate the cross-sectional area of each of the segregated particles 2b present in the dielectric layer 2 and the area of the region occupied by the segregated particles 2b present in the dielectric layer 2 in the reflected electron image.

The cross-sectional area of the segregated particles 2b in the dielectric layer 2 is calculated using the image processing software for the entire segregated particles 2b present in the reflected electron image thus taken, and the average cross-sectional area of the segregated particles 2b is calculated from the cross-sectional areas of the respective segregated particles 2b. In addition, the area of the region occupied by the segregated particles 2b is calculated as the area of the region occupied by the segregated particles 2b to the area of the dielectric layer 2 in the reflected electron image thus taken. Hereinafter, the area of the region occupied by the segregated particles 2b to the area of the dielectric layer 2 is referred to as the segregation rate in some cases.

(Presence or Absence of Eu in Segregated Particles)

The method for confirming the presence or absence of Eu in the segregated particles 2b contained in the dielectric layer 2 is not limited, but for example, it can be confirmed by the following method. A mapped image of the rare earth element is created using an energy dispersive X-ray spectroscope apparatus (STEM-EDX), and the segregated particles 2b are visually determined. Thereafter, the concentration of Eu in the entire segregated particles 2b which are visually determined was measured by point analysis using a STEM-EDX to confirm the presence or absence of Eu in the segregated particles 2b.

The segregated particles containing Eu at 2 wt % or more in terms of $Eu_2O_3$ in a case in which the entire oxides contained in the segregated particles are set to 100 wt % are regarded as the segregated particles which substantially contain Eu. Hereinafter, the segregated particles which substantially contain Eu are referred to as the Eu-containing segregated particles in some cases.

(Dielectric Layer)

The dielectric layer 2 in the present embodiment has a segregation rate of 5% or less, and the average cross-sectional area of the segregated particles 2b is 0.075 μm$^2$ or less. The highly accelerated life time and the temperature characteristics of capacitance are significantly improved in a case in which the segregation rate and the average cross-sectional area of the segregated particles 2b are within the above ranges.

It is preferable that the segregation rate is 0.5% or less. Furthermore, the highly accelerated life time and the temperature characteristics of capacitance are further improved in a case in which the Eu-containing segregated particles are not substantially present. Incidentally, it is regarded that the Eu-containing segregated particles are not substantially present in a case in which the number of the Eu-containing segregated particles in the entire segregated particles $2b$ in the field of view for observation is less than 10%. In addition, the state that the Eu-containing segregated particles are not substantially present is also referred to as a state that the segregated particles do not substantially contain Eu.

It is preferable that the component constituting the segregated particles $2b$ of the present embodiment is substantially composed of a R—Si—Ba—Ti—O-based composite oxide. The content proportion of the rare earth oxide to an oxide of Si in the composite oxide is preferably $R_2O_3$:$SiO_2$=0.3:0.7 to 0.7:0.3 and more preferably $R_2O_3$:$SiO_2$=approximately 0.5:0.5 in the molar ratio in terms of $R_2O_3$ to the molar ratio in terms of $SiO_2$.

The form of other dielectric particles $2c$ is not particularly limited. Examples of the form of other dielectric particles $2c$ may include particles which are totally dissolved in a solid state at a low concentration and have a contrast similar to that of the shell portion $2a2$ of the dielectric particles $2a$ having a core-shell structure, $ABO_3$ particles of which the additives are not dissolved at all in a solid state, and dielectric particles in which only the additives other than the rare earth element are dissolved in a solid state. Incidentally, the existence probability of other dielectric particles $2c$ may be 0%, that is, the particles in the dielectric layer $2$ according to the present embodiment may be only the dielectric particles $2a$ having the core-shell structure and the segregated particles $2b$.

(Internal Electrode Layer)

The electrically conductive material contained in the internal electrode layer $3$ is not particularly limited, but it is possible to use a relatively inexpensive base metal since the material constituting the dielectric layer $2$ exhibits reduction resistance. Ni or an Ni alloy is preferable in the case of using a base metal as the electrically conductive material. As the Ni alloy, an alloy of Ni and one or more kinds of elements selected from Mn, Cr, Co, and Al is preferable. The content of Ni in the alloy is preferably 95 wt % or more. Incidentally, the respective trace components such as P may be contained in Ni or the Ni alloy at about 0.1 wt % or less in total. The thickness of the internal electrode layer $3$ may be appropriately changed depending on the use, and it is not particularly limited. Usually, it is from 0.1 to 3.0 µm and preferably about from 0.5 to 2.0 µm.

(External Electrode)

The electrically conductive material contained in the external electrode $4$ is not particularly limited, but in the present embodiment, it is possible to use inexpensive Ni, Cu, or an alloy thereof. The thickness of the external electrode $4$ may be appropriately determined depending on the use and the like, but it is preferably usually about from 10 to 50 µm.

(Method Manufacturing Laminated Ceramic Capacitor)

The laminated ceramic capacitor $1$ of the present embodiment is manufactured by fabricating a green chip by a usual printing method or sheet method using a paste, firing this, then printing or transferring the external electrode $4$ thereon, and then firing the resultant in the same manner as in the laminated ceramic capacitor of the prior art. Hereinafter, the manufacturing method will be specifically described.

First, a dielectric raw material (dielectric ceramic composition powder) is prepared, and this is formed into a coating to adjust a paste (paste for dielectric layer) for forming the dielectric layer $2$.

(Dielectric Raw Material)

First, a raw materials for $ABO_3$ is prepared as the raw material for the main component of the dielectric raw material. It is preferable to use barium titanate represented by $Ba_uTi_vO_3$ as $ABO_3$.

As the raw materials for $ABO_3$, it is possible to use those which are manufactured by various methods such various kinds of liquid phase methods (for example, an oxalic acid method, a hydrothermal synthesis method, an alkoxide method, and a sol-gel method) in addition to the so-called solid phase method.

In addition, in the case of using barium titanate represented by $Ba_uTi_vO_3$ as the raw materials for $ABO_3$, it is preferable that u/v is in the range of $1.000 \leq u/v \leq 1.005$. It is easy to suitably control the grain growth at the time of firing as u/v is set to be in the above range. Moreover, the temperature characteristics and highly accelerated life time of the laminated ceramic capacitor $1$ that is manufactured using the dielectric raw material are improved.

In the case of using barium titanate as a main component, the average particle size of the barium titanate raw material is not particularly limited, but it is preferably from 0.10 to 0.3 µm and more preferably from 0.12 to 0.17 µm. It is easy to suitably control sintering and to suitably control the grain growth of the segregated particles $2b$ as the particle size of the barium titanate raw material to be used is set to be in the above range. Moreover, the reliability and temperature characteristics of the laminated ceramic capacitor $1$ that is manufactured using the dielectric raw material are improved.

As the raw material for the sub-component, it is possible to use the oxides, mixtures, or composite oxides of the components described above. In addition, it is also possible to use various kinds of compounds to be the oxides or composite oxides described above by firing as a mixture. Examples of the various kinds of compounds may include a carbonate, an oxalate, a nitrate, a hydroxide, and an organometallic compound. In addition, the size of the raw material for the sub-component is preferably smaller than the size of the raw material for the main component. More preferably, the average particle size of the raw material for the sub-component is ½ or less of the average particle size of the raw material for the main component.

The method for manufacturing the dielectric ceramic composition powder is not particularly limited. Examples of the method other than the method described above may include a method in which the sub-component is coated on the barium titanate powder. The kind of the sub-component to be coated is also not particularly limited. It is preferably one or more kinds of oxides selected from an oxide of R (Eu, Ra, and Rb), an oxide of Mg, and an oxide of Si. As the method for coating, a known method may be used. For example, it is possible to coat each sub-component on the barium titanate particle surface by preparing one or more kinds of oxides selected from an oxide of R (Eu, Ra, and Rb), an oxide of Mg, and an oxide of Si as a solution, mixing the solution with the slurry in which barium titanate is dispersed, and then subjecting the mixture to the heat treatment.

The content of each compound in the dielectric raw material is not particularly limited. Incidentally, the present inventors have confirmed that the composition of the dielectric ceramic composition does not substantially change before and after firing except a special case such as a case in which a portion of each sub-component described above is vaporized at the time of firing in the present embodiment.

(Paste for Dielectric Layer)

The paste for dielectric layer may be an organic coating obtained by kneading the dielectric raw material with an organic vehicle or an aqueous coating obtained by kneading a dielectric raw material with an aqueous vehicle.

The organic vehicle is one obtained by dissolving a binder in an organic solvent. The binder is not particularly limited, and it may be appropriately selected from various kinds of binders used in a general organic vehicle such as ethyl cellulose and polyvinyl butyral. The organic solvent to be used is also not particularly limited, and it may be appropriately selected from various kinds of organic solvents such as terpineol, butyl carbitol, acetone, and toluene depending on the method to be used such as a printing method and a sheet method.

The aqueous vehicle is one obtained by dissolving a water-soluble binder, dispersant, or the like in water. The water-soluble binder used in the aqueous vehicle is not particularly limited, and it may be appropriately selected from various kinds of binders used in a general aqueous vehicle such as polyvinyl alcohol, cellulose, and a water-soluble acrylic resin.

(Paste for Internal Electrode)

The paste for internal electrode layer is prepared by kneading an electrically conductive material composed of the various kinds of electrically conductive metals or alloys described above or various kinds of oxides, organometallic compounds, or resinates which are converted into the electrically conductive material described above by firing with the organic vehicle described above. In addition, the paste for internal electrode layer may contain a common material. The common material is not particularly limited, but it is preferable to contain barium titanate.

(Paste for External Electrode)

The paste for external electrode may be prepared in the same manner as the paste for internal electrode layer described above.

The content of the organic vehicle in each pastes described above is not particularly limited, and it may be a usual content, for example, the binder is about from 1 to 10 wt % and the solvent is about from 10 to 50 wt %. In addition, additives selected from inorganic substances and organic substances such as various kinds of dispersant, plasticizers, dielectrics, and insulators may be contained in each paste if necessary. The total content thereof is preferably 10 wt % or less.

(Printing and Lamination)

In the case of using the printing method, the paste for dielectric layer and the paste for internal electrode layer are printed on a substrate, such as PET, laminated, cut into a predetermined shape, and then peeled off from the substrate to obtain a green chip.

In addition, in the case of using the sheet method, a green sheet is formed using the paste for dielectric layer, the paste for internal electrode layer is printed thereon to form an internal electrode pattern, and this is then laminated to obtain a green chip.

(Binder Removal)

The conditions for binder removal are not particularly limited, but the temperature increasing speed is preferably set to from 5 to 300° C./hour, the retention temperature is preferably set to from 180 to 800° C., and the temperature retention time is preferably set to from 0.5 to 48 hours. In addition, the atmosphere for binder removal is preferably set to be in the air or a reducing atmosphere.

(Firing)

The green chip is fired after binder removal. The temperature increasing speed is preferably from 600 to 10000° C./hour and more preferably from 2000 to 10000° C./hour. The retention temperature at the time of firing is preferably 1300° C. or lower and more preferably from 1180 to 1290° C. The retention time at the time of firing is preferably from 0.05 to 20 hours and more preferably from 0.1 to 4 hours. As the temperature increasing speed and the retention time are controlled in the above ranges, it is easy to control the size of the segregated particles $2b$ in the intended range while sufficiently dissolving the sub-component in the dielectric particles $2a$ in a solid state. Moreover, it is easy to densify the dielectric ceramic composition while preventing spheroidizing of the electrode, and thus the highly accelerated life time is improved. Incidentally, the temperature decreasing speed is not particularly limited, but it is preferably from 50 to 1000° C./hour.

The atmosphere for firing is preferably a reducing atmosphere. The atmosphere gas is not particularly limited, and for example, it is possible to use a mixed gas of $N_2$ and $H_2$ by humidifying.

The oxygen partial pressure at the time of firing may be appropriately determined depending on the kind of the electrically conductive material in the paste for internal electrode. For example, in the case of using a base metal such as Ni or a Ni alloy as the electrically conducting material, it is preferable to set the oxygen partial pressure in the firing atmosphere to from $10^{-14}$ to $10^{-10}$ MPa. As the oxygen partial pressure is set to be within the above range, sintering of the electrically conductive material of the internal electrode layer 3 is likely to be normally conducted while preventing the oxidation of the internal electrode layer 3.

(Annealing)

It is preferable to subject the capacitor device body 10 to the annealing treatment after being fired in a reducing atmosphere. Annealing is a treatment for reoxidizing the dielectric layer 2, and this makes it possible to significantly increase the insulation resistance (IR) of the dielectric layer 2 and to improve the highly accelerated life time (IR life time).

The atmosphere at the time of annealing is not particularly limited, but it is preferable to set the oxygen partial pressure to from $10^{-9}$ to $10^{-5}$ MPa. As the oxygen partial pressure is set to be within the above range, it is easy to reoxidize the dielectric layers 2 while preventing the oxidation of the internal electrode layer 3.

The retention temperature at the time of annealing is not particularly limited, but it is set to preferably 1100° C. or lower and even more preferably from 950 to 1090° C. The dielectric layer 2 is likely to be sufficiently oxidized as the retention temperature is set to be within the above range. In addition, the oxidation of the internal electrode layer 3 and the reaction of the internal electrode layer 3 with the dielectric layer 2 are prevented and the temperature characteristics, insulation resistance (IR), highly accelerated life time (IR life time), and capacitance of the laminated ceramic capacitor 1 are likely to be favorable.

As the conditions for annealing other than those described above, the temperature retention time is set to preferably from 0 to 20 hours and more preferably from 2 to 4 hours. The temperature decreasing speed is set to preferably from 50 to 1000° C./hour and more preferably from 100 to 600° C./hour. In addition, the kind of atmosphere gas for annealing is not particularly limited, but for example, it is preferable to use humidified $N_2$ gas.

In order to humidify $N_2$ gas, a mixed gas, or the like in the binder removal treatment, firing, and annealing, for example, a wetter or the like may be used. The water temperature is preferably about from 5 to 75° C. in the case of using a wetter.

The binder removal treatment, firing, and annealing may be continuously conducted or each of them may be independently conducted.

In addition, in the embodiment described above, a laminated ceramic capacitor including a dielectric layer composed of the dielectric ceramic composition and electrode layers is described, but the use of the dielectric ceramic composition according to the present invention is not particularly limited, and it can also be suitably used as a single-layer capacitor, a dielectric filter, or the like. In addition, the kind of ceramic electronic device according to the present invention is also not particularly limited.

EXAMPLES

Hereinafter, the present invention will be explained with reference to further detailed Examples, but the present invention is not limited to these Examples.

Example 1

A $Ba_uTi_vO_3$ powder (u/v=1.004) of which the average particle size was a specific average particle size (120 to 170 nm) presented in the following Table 1 was prepared as a raw material powder of barium titanate of the main component.

A $Eu_2O_3$ powder, a $Yb_2O_3$ powder, and a $Tb_2O_{3.5}$ powder and a $Y_2O_3$ powder were prepared, respectively, as a raw material powder of an oxide of Eu, as a raw material powder of an oxide of Ra, and as a raw material powder of an oxide of Rb which were the first sub-component.

A $SiO_2$ powder was prepared as a raw material powder of an oxide of Si which was the second sub-component.

Furthermore, a $BaCO_3$ powder was prepared as a raw material powder of an oxide of Ba. A $MnCO_3$ powder was prepared as a raw material powder of an oxide of Mn. A $V_2O_5$ powder was prepared as a raw material powder of an oxide of V. A MgO powder was prepared as a raw material powder of an oxide of Mg.

Incidentally, the raw material powders for all the sub-components were subjected to preliminary grinding so as to arrange the average particle size of all the sub-components in a specific average particle size (50 to 170 nm) presented in the following Table 1, respectively.

Next, the raw material powder for each sub-component was weighed such that the content thereof with respect to 100 moles of barium titanate was the content presented in the following Table 1. With regard to the raw material powders for the sub-components which were not presented in Table 1, the $Eu_2O_3$ powder as a raw material powder of an oxide of Eu was weighed by 0.65 mole, the $Yb_2O_3$ powder as a raw material powder of an oxide of Ra was weighed by 2.5 moles, the $SiO_2$ powder as a raw material powder of an oxide of Si was weighed by 3 moles, the $BaCO_3$ powder as a raw material powder of an oxide of Ba was weighed by 2 moles, the $MnCO_3$ powder as a raw material powder of an oxide of Mn was weighed by 0.2 mole, the $V_2O_5$ powder as a raw material powder of an oxide of V was weighed by 0.05 mole, and the MgO powder as a raw material powder of an oxide of Mg was weighed by 0.9 mole. These respective powders were wet mixed in a ball mill for 20 hours, ground, and dried, thereby obtaining a dielectric raw material. Incidentally, $BaCO_3$ and $MnCO_3$ are converted into BaO and MnO by firing to be contained in the dielectric ceramic composition.

Subsequently, the dielectric raw material thus obtained: 100 parts by weight, a polyvinyl butyral resin: 10 parts by weight, dioctyl phthalate (DOP): 5 parts by weight, and an alcohol: 100 parts by weight were mixed together in a ball mill to form a paste, thereby obtaining a paste for dielectric layer. Incidentally, in the paste for dielectric layer, DOP is a plasticizer and the alcohol is a solvent.

In addition, separately from the paste for dielectric layer, Ni particles: 44.6 parts by weight, terpineol 52 parts by weight, ethylcellulose: 3 parts by weight, and benzotriazole: a 0.4 part by weight were kneaded using a three-rollers milling machine to form a paste, thereby preparing a paste for internal electrode layer.

Thereafter, a green sheet was formed on a PET film using the paste for dielectric layer. The green sheet was formed such that the thickness thereof after drying became 2.5 μm.

Subsequently, an electrode layer in a predetermined pattern was printed on the green sheet using the paste for internal electrode layer. The green sheet was peeled off from the PET film after printing the electrode layer, thereby fabricating a green sheet having an electrode layer.

Subsequently, a plurality of the green sheets having an electrode layer were laminated and pressure bonded to form a green laminate, and the green laminate was cut in a predetermined size to obtain a green chip.

Subsequently, the green chip thus obtained was subjected to the binder removal treatment, firing, and annealing under the following conditions, thereby obtaining a laminated and fired ceramic body.

The conditions for binder removal treatment were set as follows; temperature increasing speed: 25° C./hour, retention temperature: 235° C., retention time: 8 hours, and atmosphere: in the air.

The conditions for firing were set as follows: temperature increasing speed: 600° C./hour, retention temperature: 1260° C., retention time: 1 hour, temperature decreasing speed: 200° C./hour, atmosphere gas: humidified $N_2+H_2$ mixed gas, and oxygen partial pressure: $10^{-12}$ MPa.

The conditions for annealing were set as follows: temperature increasing speed: 200° C./hour, retention temperature: 1050° C., retention time: 3 hours, temperature decreasing speed: 200° C./hour, atmosphere gas: humidified $N_2$ gas, and oxygen partial pressure: $10^{-7}$ MPa.

Incidentally, a wetter was used for the humidification of the atmosphere gas at the time of firing and annealing.

Subsequently, the end face of the laminated and fired ceramic body thus obtained was subjected to barrel polishing. The paste for external electrode was coated on the end face subjected to the barrel polishing, and the resultant was subjected to the baking treatment in a reducing atmosphere, thereby obtaining samples for laminated ceramic capacitor (hereinafter, simply referred to as the "capacitor sample" in some cases) of Sample Nos. 1 to 12 presented in Table 1. Incidentally, the size of the capacitor samples thus obtained was 3.2 mm×1.6 mm×1.2 mm, the interlayer thickness of the dielectric layer was 2.0 μm, the thickness of the internal electrode was 1.0 μm, and the number of dielectric layers was 100 layers.

For the capacitor samples thus obtained, the confirmation of the temperature characteristics of capacitance, the highly accelerated life time (HALT), the presence or absence of a core-shell structure in the dielectric particles, the average cross-sectional area of the segregated particles 2b, the segregation rate, and the presence or absence of Eu contained in the segregated particles 2b was carried out by the following methods, respectively. The measurement results are presented in Tables 1 to 4.

(Temperature Characteristics of Capacitance)

The capacitance of the capacitor samples was measured at from −55 to 155° C. under the conditions having a frequency of 1.0 kHz and an input signal level (voltage for measurement) of 1.0 Vrms, the rate of change in capacitance was calculated on the basis of the capacitance at 25° C., and whether the calculated result met the X8R characteristics of the temperature characteristics of the EIA standards or not was evaluated. The sample which met the X8R characteristics was evaluated to be favorable. In Tables 1 to 4, ○ is granted to the sample which meets the X8R characteristics and × is granted to the sample which does not meet the X8R characteristics.

(Highly Accelerated Life Time)

The highly accelerated life time was evaluated by retaining the capacitor samples in a state that a direct current voltage was applied to the capacitor samples in an electric field of 100 V at 175° C. and measuring the insulation degradation time of the capacitor samples. In the present Example, the time from the start of voltage application until the insulation resistance dropped by one digit was defined as the life time. In addition, in the present Example, the above evaluation was conducted for 20 capacitor samples, and the average failure time (MTTF) calculated through the Weibull analysis on this was defined as the average life time of the sample. In the present Example, a time of 5 hours or longer was evaluated to be favorable and a time of 10 hours or longer was evaluated to be significantly favorable. Incidentally, in Tables 1 to 4, ⊙ is granted to the sample which has the MTTF of 10 hours or longer, ○ is granted to the sample which has the MTTF of 5 hours or longer and shorter than 10 hours, and × is granted to the sample which has the MTTF of shorter than 5 hours.

(Presence or Absence of Core-shell Structure)

First, the capacitor sample thus obtained was cut in a plane perpendicular to the internal electrode, and the cut cross-section was polished. Thereafter, the polished cross-section was subjected to the etching treatment by ion milling, and a reflected electron image of the etched cross-section was taken in a field of view for observation of 3.0×4.0 μm using a scanning electron microscope (FE-SEM). The reflected electron image was taken by 5 sheets at different locations on the cut cross-section. In the photographs of the reflected electron images, the dielectric particles which had different contrasts at the central portion and the peripheral portion of the particles were adopted as the dielectric particles having a core-shell structure.

Furthermore, the particles having a contrast (contrast different from that of the internal electrode as well) that is apparently different from those of the core portion and the shell portion in the reflected electron image among the particles other than the dielectric particles having a core-shell structure were adopted as the segregated particles.

In addition, the dielectric particles having a core-shell structure and the segregated particles were distinguished from each other through the observation using a scanning transmission electron microscope (STEM). In this case, the mapping of the rare earth elements was conducted using an energy dispersive X-ray spectroscope apparatus (STEM-EDX) attached to the STEM, and the mapped image was created. Thereafter, in the mapped image, the contrast was visually compared in the same manner as in the reflected electron image to determine the dielectric particles having the core-shell structure and the segregated particles.

It was confirmed that the result for the determination of the dielectric particles having a core-shell structure and the segregated particles in the case of using a FE-SEM was favorably consistent with that in the case of using a STEM-EDX. In addition, at this time, the concentration of the rare earth element in the segregated particles was two or more times the average concentration of the rare earth element in the shell portion of the dielectric particles having the core-shell structure.

It was confirmed that oxygen was present at the location at which the rare earth element was present by conducting the mapping of oxygen when conducting the mapping of the element using the STEM-EDX. Furthermore, it was confirmed that the rare earth element was present in the form of a rare earth oxide or a rare earth composite oxide by X-ray diffraction (XRD). The same evaluation was conducted for the other elements, and it was confirmed that they were present in the form of an oxide or a composite oxide.

Incidentally, there were also samples containing other dielectric particles in addition to the dielectric particles having a core-shell structure and the segregated particles.

(Segregation Rate and Average Cross-sectional Area of Segregated Particles)

First, the reflected electron image thus obtained was subjected to the contrast analysis using the image processing software to be classified into the dielectric layer and the electrode layer. Thereafter, the dielectric layer was classified into the segregated particles and particles other than the segregated particles. Next, the area ratio of the segregated particles in the entire dielectric layer was calculated and adopted as the segregation rate. In addition, the cross-sectional area of each and every of the segregated particles in the reflected electron image thus obtained was calculated, and the average value thereof was adopted as the average cross-sectional area of the segregated particles.

(Presence or Absence of Eu-containing Segregated Particles)

The polished cross-section was observed using a STEM. The field of view for observation was 1.0×1.0 μm. Thereafter, the mapping of each element was conducted using an energy dispersive X-ray spectroscope apparatus (STEM-EDX) attached to the STEM.

The location at which the segregated particles were present was visually confirmed through the mapping of the rare earth element. Thereafter, the point analysis of the entire segregated particles in the field of view for observation was conducted using the STEM-EDX to confirm the presence or absence of the Eu-containing segregated particles.

The segregated particles containing Eu at 2 wt % or more in terms of $Eu_2O_3$ in a case in which oxides of the entire elements contained in the segregated particles were set to 100 wt % were regarded as the Eu-containing segregated particles. In addition, it was regarded that the Eu-containing segregated particles were substantially contained in a case in which the number of Eu-containing segregated particles was 10 or more among 100 segregated particles which were arbitrarily selected from the segregated particles in the field of view for observation.

TABLE 1

| Sample No. | Average particle size of main | Average particle size of accessor | First sub-component Ra Kind | First sub-component Ra Amount (mol %) | Rb Kind | Rb Amount (mol %) | Y (mol %) | Segregation rate (%) | Average cross-sectional area | X8R | HALT MTTF (hr) | Judgment |
|---|---|---|---|---|---|---|---|---|---|---|---|---|
| *1 | 150 | 150 | | | Tb4O7 | 0.9 | 0.9 | 5.1 | 0.080 | ○ | 2.9 | X |
| *2 | 150 | 150 | Y2O3 | 0.5 | Tb4O7 | 0.9 | 1.4 | 5.5 | 0.085 | X | 4.2 | X |
| 3 | 150 | 135 | | | Tb4O7 | 0.9 | 0.9 | 4.0 | 0.068 | ○ | 5.5 | ○ |
| 4 | 150 | 75 | | | Tb4O7 | 0.9 | 0.9 | 3.6 | 0.052 | ○ | 7.5 | ○ |
| *5 | 120 | 135 | | | Tb4O7 | 0.9 | 0.9 | 5.2 | 0.070 | X | 4.5 | X |
| 6 | 120 | 110 | | | Tb4O7 | 0.9 | 0.9 | 4.2 | 0.062 | ○ | 7.0 | ○ |
| 7 | 120 | 50 | | | Tb4O7 | 0.9 | 0.9 | 3.2 | 0.046 | ○ | 8.5 | ○ |
| 8 | 120 | 50 | Y2O3 | 0.5 | Tb4O7 | 0.9 | 1.4 | 3.5 | 0.051 | ○ | 9.0 | ○ |
| *9 | 170 | 170 | | | Tb4O7 | 0.9 | 0.9 | 5.3 | 0.083 | ○ | 1.6 | X |
| 10 | 170 | 110 | | | Tb4O7 | 0.9 | 0.9 | 4.4 | 0.066 | ○ | 5.1 | ○ |
| 11 | 170 | 75 | | | Tb4O7 | 0.9 | 0.9 | 3.8 | 0.050 | ○ | 6.2 | ○ |
| 12 | 170 | 75 | Y2O3 | 0.5 | Tb4O7 | 0.9 | 1.4 | 4.1 | 0.051 | ○ | 7.0 | ○ |

*represents Comparative Example

From Table 1, both of the temperature characteristics of capacitance and the highly accelerated life time were favorable in a case in which the segregation rate was 5.0% or less and the average cross-sectional area of the segregated particles was 0.075 μm² or less (sample Nos. 3, 4, 6 to 8, and 10 to 12).

On the other hand, the temperature characteristics of capacitance and/or the highly accelerated life time deteriorated in a case in which the segregation rate exceeded 5.0% and/or in a case in which the average cross-sectional area of the segregated particles exceeded 0.075 μm² (sample Nos. 1, 2, 5, and 9).

Example 2

The samples for laminated ceramic capacitor of Sample Nos. 21 to 27 were fabricated in the same manner as Sample No. 8 in Example 1 except that the average particle size of barium titanate ($Ba_u Ti_v O_3$ (u/v=1.004)) to be the main raw material was set to 150 nm and the kinds of oxides of rare earth elements Ra and Rb were changed to those presented in Table 2, and the samples were subjected to the same characteristic evaluation as in Example 1. The results are presented in Table 2.

TABLE 2

| Sample No. | First sub-component Ra Kind | Ra Amount (=β) (mol %) | Rb Kind | Rb Amount (mol %) | Y (mol %) | Segregation rate (%) | Average cross-sectional area (μm2) | X8R | HALT MTTF (hr) | Judgment |
|---|---|---|---|---|---|---|---|---|---|---|
| 8 | Yb2O3 | 2.5 | Y2O3 | 0.5 | Tb4O7 | 0.9 | 1.4 | 3.5 | 0.051 | ○ | 9.0 | ○ |
| 21 | Yb2O3 | 2.5 | Y2O3 | 0.5 | Dy2O3 | 0.9 | 1.4 | 3.9 | 0.061 | ○ | 8.0 | ○ |
| 22 | Yb2O3 | 2.5 | Y2O3 | 0.5 | Ho2O3 | 0.9 | 1.4 | 5.0 | 0.065 | ○ | 7.2 | ○ |
| 23 | Yb2O3 | 2.5 | Y2O3 | 0.5 | Gd2O3 | 0.9 | 1.4 | 3.6 | 0.050 | ○ | 8.4 | ○ |
| 24 | Sc2O3 | 2.5 | Y2O3 | 0.5 | Tb4O7 | 0.9 | 1.4 | 3.7 | 0.060 | ○ | 7.2 | ○ |
| 25 | Er2O3 | 2.5 | Y2O3 | 0.5 | Tb4O7 | 0.9 | 1.4 | 3.6 | 0.052 | ○ | 7.9 | ○ |
| 26 | Tm2O3 | 2.5 | Y2O3 | 0.5 | Tb4O7 | 0.9 | 1.4 | 3.5 | 0.052 | ○ | 7.3 | ○ |
| 27 | Lu2O3 | 2.5 | Y2O3 | 0.5 | Tb4O7 | 0.9 | 1.4 | 3.8 | 0.055 | ○ | 8.0 | ○ |

From Table 2, both of the temperature characteristics of capacitance and the highly accelerated life time were favorable in a case in which the segregation rate was 5.0% or less and the average cross-sectional area of the segregated particles was 0.075 µm² or less even though the kinds of oxides of rare earth elements Ra and Rb were changed as Sample Nos. 21 to 27.

Example 3

The sample for laminated ceramic capacitor of Sample No. 31 was fabricated in the same manner as Sample No. 4 in Example 1 except the conditions for firing, and the sample was subjected to the same characteristic evaluation as in Example 1. The conditions for firing of Sample No. 31 were set as follows; temperature increasing speed: 2000° C./hour and retention time: 0.2 hour. The results are presented in the section for Sample No. 31 of Table 3.

In addition, the dielectric raw material was prepared by the method to be described below, Sample Nos. 32 and 33 were fabricated in the same manner as Sample No. 4 in Example 1, and the samples were subjected to the same characteristic evaluation as in Example 1.

For the preparation of the dielectric raw material of Sample No. 32, $BaTiO_3$ of the main component was wet mixed with only an oxide of Si, $Yb_2O_3$ of an oxide of Ra, and $Tb_2O_{3.5}$ of an oxide of Rb, and the mixture was subjected to the heat treatment at 900° C. for 4 hours in the air. Thereafter, the sizing was conducted by wet mixing the resultant again, thereby obtaining a $BaTiO_3$ reacted powder.

The $BaTiO_3$ reacted powder was observed using a scanning electron microscope (FE-SEM), and Si oxide, $Yb_2O_3$, and $Tb_2O_{3.5}$ which had reacted with $BaTiO_3$ of the main component were observed. In addition, the reaction composition was confirmed by X-ray diffraction (XRD), and Si—Ra—O or Si—Rb—O was confirmed. The $BaTiO_3$ reacted powder was mixed with the rest of the sub-components so as to have the composition of Sample No. 4, thereby obtaining a dielectric raw material.

For the preparation of the dielectric raw material of Sample No. 33, $BaTiO_3$ of the main component was wet mixed with only $Eu_2O_3$ of an oxide of Eu, and the mixture was subjected to the heat treatment at 900° C. for 4 hours in the air. Thereafter, the sizing was conducted by wet mixing the resultant again, thereby obtaining a $BaTiO_3$ reacted powder.

The $BaTiO_3$ reacted powder was observed using a scanning electron microscope (FE-SEM), and $Eu_2O_3$ which had reacted with $BaTiO_3$ of the main component was observed. The $BaTiO_3$ reacted powder was mixed with the rest of the sub-components so as to have the composition of Sample No. 4, thereby obtaining a dielectric raw material.

TABLE 3

| Sample No. | Feature of production method compared to sample 4 | Segregation of Eu | Segregation rate (%) | Average cross-sectional | X8R | HALT MTTF (hr) | Judgment |
|---|---|---|---|---|---|---|---|
| 4 |  | Presence | 3.6 | 0.052 | ○ | 6.8 | ○ |
| 31 | Acceleration of calcination | Absence | 3.1 | 0.045 | ○ | 12.5 | ◉ |
| 32 | Preliminary calcination of Si—Tb— | Absence | 4.1 | 0.060 | ○ | 10.8 | ◉ |
| 33 | Coating of Eu on main component | Absence | 3.2 | 0.047 | ○ | 11.8 | ◉ |

The temperature characteristics of capacitance were favorable in Sample Nos. 31 to 33 in which the segregation rate was 5.0% or less, the average cross-sectional area of the segregated particles was 0.075 μm² or less, and the Eu-containing segregated particles were not substantially contained. In addition, the highly accelerated life time of Sample Nos. 31 to 33 was more favorable as compared to that of Sample No. 4.

Example 4

As an oxide of Ra, $Sc_2O_3$, $Er_2O_3$, and $Lu_2O_3$ were prepared in addition to $Yb_2O_3$, and as an oxide of Rb, $Dy_2O_3$, $Ho_2O_3$, and $Gd_2O_3$ were prepared in addition to $Tb_2O_{3.5}$ and $Y_2O_3$, and the samples for laminated ceramic capacitor of Sample Nos. 41 to 68 were fabricated in the same manner as Sample No. 8 in Example 1 except the compositions of the first sub-component and the second sub-component, and the samples were subjected to the same characteristic evaluation as in Example 1. The results are presented in Table 4.

2a Dielectric particles having core-shell structure
2a1 Core portion
2a2 Shell portion
2b Segregated particles
2c Other dielectric particles
3 Internal electrode layer
4 External electrode
10 Capacitor device body

The invention claimed is:
1. A dielectric ceramic composition comprising:
a main component having a perovskite crystal structure expressed by general formula $ABO_3$ where A is at least one selected from Ba, Ca, and Sr and B is at least one selected from Ti and Zr;
a first sub-component of an oxide of a rare earth element; and
a second sub-component of an oxide of Si; and
at least dielectric particles having a core-shell structure and segregated particles, wherein

TABLE 4

| Sample No. | First sub-component | | | | | | | | Second sub- Si ($=\delta$) | Segre-gation $\alpha/\delta$ | of Eu | Segregation rate (%) | Average cross-sectional | X8R | HALT MTTF (hr) | Evaluation |
|---|---|---|---|---|---|---|---|---|---|---|---|---|---|---|---|---|
| | Eu | Ra | | β | Rb | | | y | | | | | | | | |
| | Eu ($=\alpha$) | Yb | Others | | Y | Tb | Others | | | | | | | | | |
| 41 | 0.05 | 2.1 | | 2.1 | 0.5 | 0.9 | | 1.4 | 2.5 | 0.020 | Presence | 2.1 | 0.045 | ○ | 6.2 | ○ |
| 42 | 0.075 | 2.1 | | 2.1 | 0.5 | 0.9 | | 1.4 | 2.5 | 0.030 | Absence | 1.6 | 0.039 | ○ | 10.1 | ◎ |
| 43 | 0.2 | 2.1 | | 2.1 | 0.5 | 0.9 | | 1.4 | 2.5 | 0.080 | Absence | 1.7 | 0.039 | ○ | 12.0 | ◎ |
| 44 | 0.5 | 2.1 | | 2.1 | 0.5 | 0.9 | | 1.4 | 2.5 | 0.200 | Absence | 2.1 | 0.041 | ○ | 13.0 | ◎ |
| 45 | 0.6 | 2.1 | | 2.1 | 0.5 | 0.9 | | 1.4 | 2.5 | 0.240 | Absence | 2.9 | 0.045 | ○ | 9.2 | ○ |
| 46 | 0.2 | 0.4 | | 0.4 | 0.5 | 0.9 | | 1.4 | 2.5 | 0.080 | Absence | 0.4 | 0.011 | ○ | 8.5 | ○ |
| 47 | 0.2 | 0.5 | | 0.5 | 0.5 | 0.9 | | 1.4 | 2.5 | 0.080 | Absence | 0.8 | 0.015 | ○ | 10.2 | ◎ |
| 48 | 0.2 | 3 | | 3 | 0.5 | 0.9 | | 1.4 | 2.5 | 0.080 | Absence | 3.9 | 0.070 | ○ | 10.4 | ◎ |
| 49 | 0.2 | 3.5 | | 3.5 | 0.5 | 0.9 | | 1.4 | 2.5 | 0.080 | Absence | 4.1 | 0.075 | ○ | 9.6 | ○ |
| 50 | 0.2 | | Sc: 2.1 | 2.1 | 0.5 | 0.9 | | 1.4 | 2.5 | 0.080 | Absence | 1.8 | 0.040 | ○ | 11.0 | ◎ |
| 51 | 0.2 | | Er: 2.1 | 2.1 | 0.5 | 0.9 | | 1.4 | 2.5 | 0.080 | Absence | 1.5 | 0.035 | ○ | 10.3 | ◎ |
| 52 | 0.2 | | Lu: 2.1 | 2.1 | 0.5 | 0.9 | | 1.4 | 2.5 | 0.080 | Absence | 2.0 | 0.043 | ○ | 11.3 | ◎ |
| 53 | 0.2 | 2.1 | | 2.1 | | 0.85 | | 0.85 | 2.5 | 0.080 | Absence | 1.2 | 0.035 | ○ | 8.2 | ○ |
| 54 | 0.2 | 2.1 | | 2.1 | | 1.0 | | 1.0 | 2.5 | 0.080 | Absence | 1.5 | 0.040 | ○ | 10.5 | ◎ |
| 55 | 0.2 | 2.1 | | 2.1 | | 4 | | 4 | 2.5 | 0.080 | Absence | 4.2 | 0.069 | ○ | 11.3 | ◎ |
| 56 | 0.2 | 2.1 | | 2.1 | | 5 | | 5 | 2.5 | 0.080 | Absence | 4.6 | 0.072 | ○ | 6.6 | ○ |
| 57 | 0.2 | 2.1 | | 2.1 | | 0.9 | Dy: 0.5 | 1.4 | 2.5 | 0.080 | Absence | 1.6 | 0.036 | ○ | 10.6 | ◎ |
| 58 | 0.2 | 2.1 | | 2.1 | 0.5 | | Dy: 0.9 | 1.4 | 2.5 | 0.080 | Absence | 1.3 | 0.038 | ○ | 10.1 | ◎ |
| 59 | 0.2 | 2.1 | | 2.1 | | 0.9 | Ho: 0.5 | 1.4 | 2.5 | 0.080 | Absence | 1.6 | 0.035 | ○ | 10.8 | ◎ |
| 60 | 0.2 | 2.1 | | 2.1 | | 0.9 | Gd: 0.5 | 1.4 | 2.5 | 0.080 | Absence | 1.3 | 0.032 | ○ | 11.2 | ◎ |
| 61 | 0.2 | 2.1 | | 2.1 | 0.5 | 0.9 | | 1.4 | 1.25 | 0.160 | Presence | 1.5 | 0.038 | ○ | 8.6 | ○ |
| 62 | 0.2 | 2.1 | | 2.1 | 0.5 | 0.9 | | 1.4 | 1.5 | 0.133 | Absence | 1.5 | 0.039 | ○ | 10.4 | ◎ |
| 63 | 0.2 | 2.1 | | 2.1 | 0.5 | 0.9 | | 1.4 | 5.0 | 0.040 | Absence | 4.8 | 0.045 | ○ | 10.2 | ◎ |
| 64 | 0.2 | 2.1 | | 2.1 | 0.5 | 0.9 | | 1.4 | 5.5 | 0.036 | Presence | 4.9 | 0.049 | ○ | 7.9 | ○ |
| 65 | 0.10 | 2.1 | | 2.1 | 0.5 | 0.9 | | 1.4 | 4.0 | 0.025 | Presence | 3.7 | 0.049 | ○ | 7.0 | ○ |
| 66 | 0.10 | 2.1 | | 2.1 | 0.5 | 0.9 | | 1.4 | 3.3 | 0.030 | Absence | 3.0 | 0.044 | ○ | 10.0 | ◎ |
| 67 | 0.5 | 2.1 | | 2.1 | 0.5 | 0.9 | | 1.4 | 2.0 | 0.250 | Absence | 1.6 | 0.020 | ○ | 10.1 | ◎ |
| 68 | 0.5 | 2.1 | | 2.1 | 0.5 | 0.9 | | 1.4 | 1.5 | 0.333 | Presence | 1.4 | 0.019 | ○ | 8.5 | ○ |

From Table 4, the temperature characteristics of capacitance and the highly accelerated life time were favorable in all of Sample Nos. 41 to 68 in which the segregation rate was 5.0% or less and the average cross-sectional area of the segregated particles was 0.075 μm² or less. Furthermore, the highly accelerated life time was more favorable in a case in which the kind and content of each sub-component were in the preferred ranges and Eu was not substantially contained in the segregated particles.

REFERENCE SIGNS LIST

1 Laminated ceramic capacitor
2 Dielectric layer at least an oxide of Eu is contained as the first sub-component,
a concentration of the rare earth element in the segregated particles is two or more times an average concentration of the rare earth element in a shell portion of the dielectric particles having the core-shell structure, and
an area of the region occupied by the segregated particles is 0.5% or more and 5.0% or less and an average of cross-sectional areas of the respective segregated particles is 0.075 μm² or less in a cross-section obtained by cutting the dielectric ceramic composition.
2. The dielectric ceramic composition according to claim 1, wherein at least oxides of three rare earth elements are contained as the first sub-component.

3. The dielectric ceramic composition according to claim 1, wherein at least an oxide of Ra and an oxide of Rb are contained as the first sub-component where Ra is at least one selected from Sc, Er, Tm, Yb, and Lu and Rb is at least one selected from Y, Dy, Ho, Tb, and Gd.

4. The dielectric ceramic composition according to claim 1, wherein $0.075 \leq \alpha \leq 0.5$,
$0.5 \leq \beta \leq 3$,
$1.0 \leq \gamma \leq 4$,
$1.5 \leq \delta \leq 5$, and
$0.030 \leq \alpha/\delta \leq 0.250$ where a content of an oxide of Eu with respect to 100 moles of the main component is $\alpha$ mole in terms of $Eu_2O_3$, a content of an oxide of Ra (Sc, Er, Tm, Yb, Lu) is $\beta$ mole in terms of $Ra_2O_3$, a content of an oxide of Rb (Y, Dy, Ho, Tb, Gd) is $\gamma$ mole in terms of $Rb_2O_3$, and a content of the second sub-component is $\gamma$ mole in terms of $SiO_2$.

5. The dielectric ceramic composition according to claim 1, wherein the segregated particles do not substantially contain Eu.

6. A ceramic electronic device comprising a dielectric layer formed of the dielectric ceramic composition according to claim 1 and an electrode layer.

* * * * *